United States Patent
Campagna

(10) Patent No.: US 6,986,045 B2
(45) Date of Patent: Jan. 10, 2006

(54) SINGLE ALGORITHM CIPHER SUITE FOR MESSAGING

(75) Inventor: Matthew J. Campagna, Ridgefield, CT (US)

(73) Assignee: Pitney Bowes Inc., Stamford, CT (US)

(*) Notice: Subject to any disclaimer, the term of this patent is extended or adjusted under 35 U.S.C. 154(b) by 630 days.

(21) Appl. No.: 09/930,903

(22) Filed: Aug. 17, 2001

(65) Prior Publication Data

US 2003/0037241 A1 Feb. 20, 2003

(51) Int. Cl.
H04L 9/00 (2006.01)

(52) U.S. Cl. .................. 713/170; 713/152; 713/166; 713/170; 713/169; 380/259; 380/282

(58) Field of Classification Search ............. 713/152, 713/166, 169, 170; 380/44
See application file for complete search history.

(56) References Cited

U.S. PATENT DOCUMENTS 5,963,646 A * 10/1999 Fielder et al. .............. 380/259
6,490,680 B1 * 12/2002 Scheidt et al. .............. 713/166
2001/0016907 A1 * 8/2001 Kang et al. ................. 713/152
2001/0055396 A1 * 12/2001 Jevans ........................ 380/282
2002/0078353 A1 * 6/2002 Sandhu et al. ............. 713/170
2002/0099942 A1 * 7/2002 Gohl ........................... 713/169

* cited by examiner

Primary Examiner—Ayaz Sheikh
Assistant Examiner—Longbit Chai
(74) Attorney, Agent, or Firm—Charles R. Malandra; Angelo N. Chaclas

(57) ABSTRACT

A method for authenticating a message recipient and for secure communication of messages from a sender to the message recipient through a server, the method being carried out by one or more data processing systems in accordance with instructions carried on one or more computer readable media. The message is communicated by sending message data encrypted with a symmetric key algorithm, a private key for the encryption algorithm being generated by hashing first data, to the message recipient through a server. The message recipient is authenticated by the exchange of second data encrypted with the encryption algorithm, an authentication key for said encryption algorithm being generated by hashing third data. The first and second data include a password, which has previously been provided to the message recipient over a separate secure channel. The first and third data are hashed with an encryption algorithm defined hash algorithm using said encryption algorithm and based on Merkle's meta-method for hashing.

7 Claims, 5 Drawing Sheets

US 6,986,045 B2

SINGLE ALGORITHM CIPHER SUITE FOR MESSAGING

BACKGROUND OF THE INVENTION

The present invention relates to methods and systems for encryption and decryption and authentication of message recipients. More particularly, it relates to methods and systems incorporating small application programs using a single, symmetric key algorithm, and which are suitable for rapid downloading.

With the rapid growth of computer to computer communications there is a growing need for security systems to protect sensitive information such as business information, credit card numbers, and the like. This is particularly true since most such communications are routed through third party systems known as servers. Existing systems typically provide server based security and require client trust in the server to protect the privacy and data integrity of messages during the delivery process. Other systems provide end-to-end privacy and data integrity but require an underlying public key infrastructure or large applications running in either the client's computer or the server.

Thus, it is an object of the present invention to provide methods and systems for providing end-to-end security for clients, where the methods and systems incorporate simple, small algorithms suitable for rapid downloading to clients.

BRIEF SUMMARY OF THE INVENTION

The following conventions apply to the description of the present invention set forth below:

E ("data", "key") represents a symmetric key encryption of the "data" with the "key".

D ("data", "key") represents the corresponding decryption of the "data" with the "key".

("Data 1"|data "2") represents concatenation of "data 1" with "data 2". As used herein ("data 1"|"data 2") also includes predetermined permutations of the data string formed by the concatenation of "data 1" and "data 2".

H ("data") represents hashing of the "data" with a hashing algorithm H.

All initialization vectors, "IVn's," are 32 bit integers.

All "keys" are formed from hashes, the digest of which may be larger or smaller than the desired key size of the underlying encryption algorithm or export restriction, in which case the digest may be truncated or padded to the desired length.

The above object is achieved and the disadvantages of the prior art are overcome in accordance with the present invention by means of a method for authenticating a message recipient, the method being carried out by one or more data processing systems in accordance with instructions carried on one or more computer readable media and including the steps of: a) generating a password P; b) sending the password P to the message recipient over a first, secure channel; c) generating a first random number as a first initialization vector IV1; d) generating H(IV1|P) as an authentication key AK; e) generating an authentication string AS as E(ACNST1, AK), where ACNST1 is a predetermined constant and E is a predetermined symmetric key encryption algorithm;

f) generating a second random number as a second initialization vector IV2;

g) sending the vectors IV1 and IV2 to said message recipient over a second channel;

h) receiving a third random number as a third initialization vector IV3 and an authentication response AR from the recipient; i) generating an authentication response key ARK as H (IV2|IV3|AS); j) generating a decryption D(AR, ARK), where D is a symmetric decryption algorithm corresponding to E; and k) authenticating the message recipient only if D(AR, ARK)=ACNST2, where ACNST2 is a second predetermined constant.

In accordance with one aspect of the present invention steps a through f above are carried out by a sender which sends the vector IV1 to the message recipient through a server, the server sending the vector IV1 together with the vector IV2 to the message recipient; and the server receives the vector IV3 and the response AR from the recipient, and carries out steps i through k to authenticate the recipient.

In accordance with another aspect of the present invention, the encryption algorithm is expressed in less than 1000 bytes of code and software comprising the algorithm can be quickly downloaded to a user's system.

In accordance with still another aspect of the present an encrypted message is sent to the recipient by: a) generating a random number as an initialization vector IV4; b) generating a private key PK as H(IV4|P), where P is a password known to a message recipient; c) generating an encryption ENC=E(M|H(M), PK), where E is a predetermined symmetric key encryption algorithm; and d) sending (IV4, ENC) to said message recipient.

In accordance with another aspect of the present invention authentication of the message recipient is received prior to sending (IV4, ENC) and the message recipient is authenticated by: a) generating a password P; b) sending the password P to the message recipient over a first, secure channel; c) generating a first random number as a first initialization vector IV1; d) selecting H(IV1|P) or H(P|IV1) as an authentication key AK; e) generating an authentication string AS as E(ACNST1, AK), where ACNST1 is a predetermined constant and E is a predetermined symmetric key encryption algorithm;

f) generating a second random number as a second initialization vector IV2; g) sending the vectors IV1 and IV2 to the message recipient over a second channel; h) receiving a third random number as a third initialization vector IV3 and an authentication response AR from the recipient over the second channel; i) making a predetermined selection of a authentication response key ARK as H(IV2|IV3|AS) or as a hash of another concatenation of IV2, IV3, and AS; j) generating a decryption D(AR, ARK), where D is a symmetric decryption algorithm corresponding to E; and k) authenticating the message recipient only if D(AR, ARK)=ACNST2, where ACNST2 is a second predetermined constant.

In accordance with still another aspect of the present invention a message recipient responds to an authentication challenge by: a) receiving initialization vectors IV1 and IV2; b) generating an authentication response key as H(IV1|P), where P is a password received from a sender; c) generating an authentication string AS as E(ACNST1, AK), where ACNST1 is a predetermined constant and E is a predetermined symmetric key encryption algorithm; d) generating a third random number as a third initialization vector IV3; e) generating an authentication response key ARK as H(IV2|IV3|AS);

f) generating an authentication response AR as E(ACNST2, ARK); and g) sending (IV3, AR) to said sender.

In accordance with another aspect of the present invention the message recipient sends the vector IV3 and the response AR to a server; and c) the server receives the vector IV3 and the response AR from the recipient, and authenticates the recipient.

In accordance with still another aspect of the present invention the message recipient receives an encrypted message: a) receiving (IV4, ENC), where ENC=E(M|H(M), PK), M is said message, and E is a predetermined encryption algorithm; b) generating PK as H(IV4|P), where P is a password received from a sender of said message over a secure channel; c) generating D(ENC, PK)=M|H(M), where D is a symmetric key decryption algorithm corresponding to E; d) calculating H(M) from said value of M generated in step c; and e) accepting said generated value of M only if said calculated value of H(M) equals said value of H(M) generated in step c.

In accordance with another aspect of the present invention, the initialization vector IV4 and the encryption ENC are received from the sender through a server.

In accordance with still yet another aspect of the present invention a method for secure communication of a message to a message recipient includes sending message data encrypted with a symmetric key algorithm, a private key for the encryption algorithm being generated by hashing first data, the first data including a password; where the first data is hashed with an encryption algorithm defined hash algorithm using the encryption algorithm, as described further below.

In accordance with another aspect of the present invention the message recipient is authenticated by the exchange of second data encrypted with the encryption algorithm, an authentication key for the encryption algorithm being generated by hashing third data, the third data including a password, where the third data is hashed with an encryption algorithm defined hash algorithm using the encryption algorithm.

Other objects and advantages of the subject invention will be apparent to those skilled in the art from consideration of the attached drawings and detailed descriptions set forth below.

DETAILED DESCRIPTION OF PREFERRED EMBODIMENTS OF THE SUBJECT INVENTION

Figure 1:
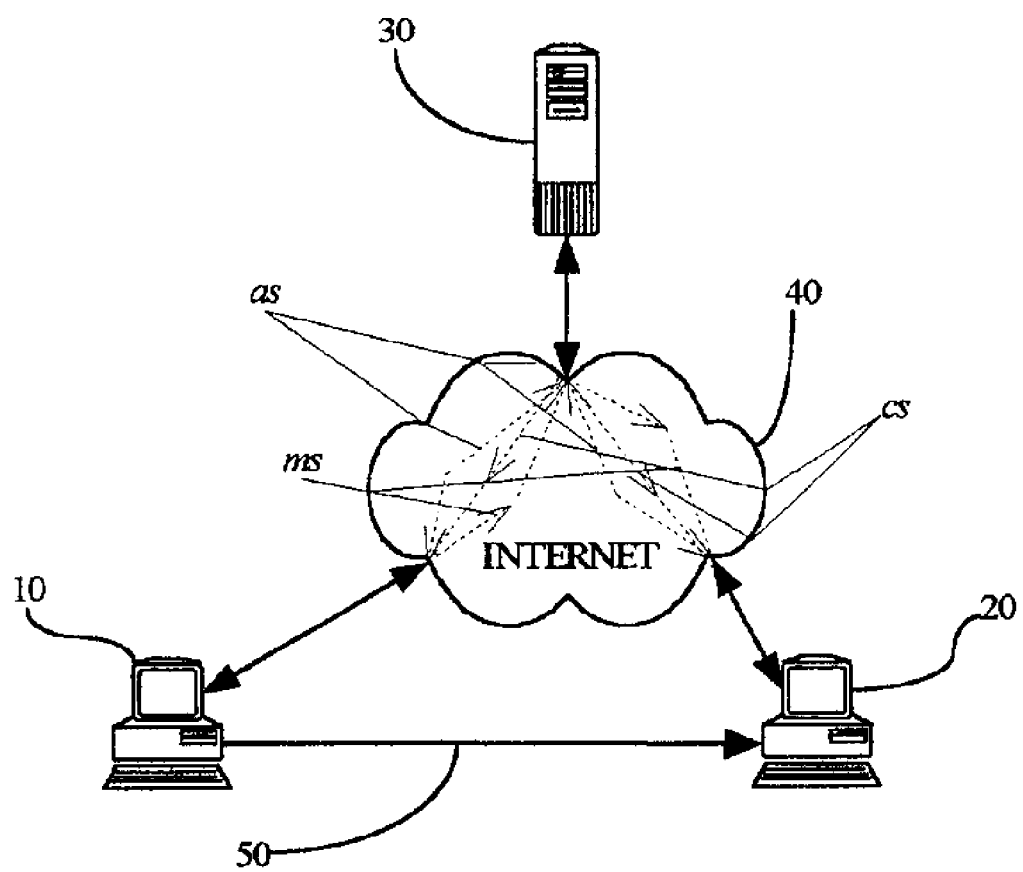
FIG. 1 shows a schematic block diagram of a network for communications in accordance with the present invention.

FIG. 1 shows a sender system 10 and a message recipient system 20, which communicate with a server 30 over the Internet 40. Other channels of communication, such as the Public Switched Telephone Network are also within the contemplation of the present invention. Authentication signals as are exchanged between system 10 and system 20 through server 30 to provide assurance that system 20 is the intended message recipient. Once recipient 20 is authenticated message signals ms are sent from system 10 to system 20 through server 30. In a preferred embodiment of the present invention code signals cs representative of instructions for controlling systems 10 and 20 to carry out various aspects of the present invention are downloaded from server 30 over Internet 40. In other embodiments of the present invention the code can be communicated by any other convenient computer readable medium such as CD's or floppy disks.

FIG. 1 also shows a secure, out-of-band channel 50 for communication of a password of sender system 10 to recipient system 20. Communication over channel 50 may be in any convenient form, provided that it provides sufficient assurance that the password is securely transmitted to recipient system 20. Details of the operation of channel 50 form no part of the present invention.

Figure 2:
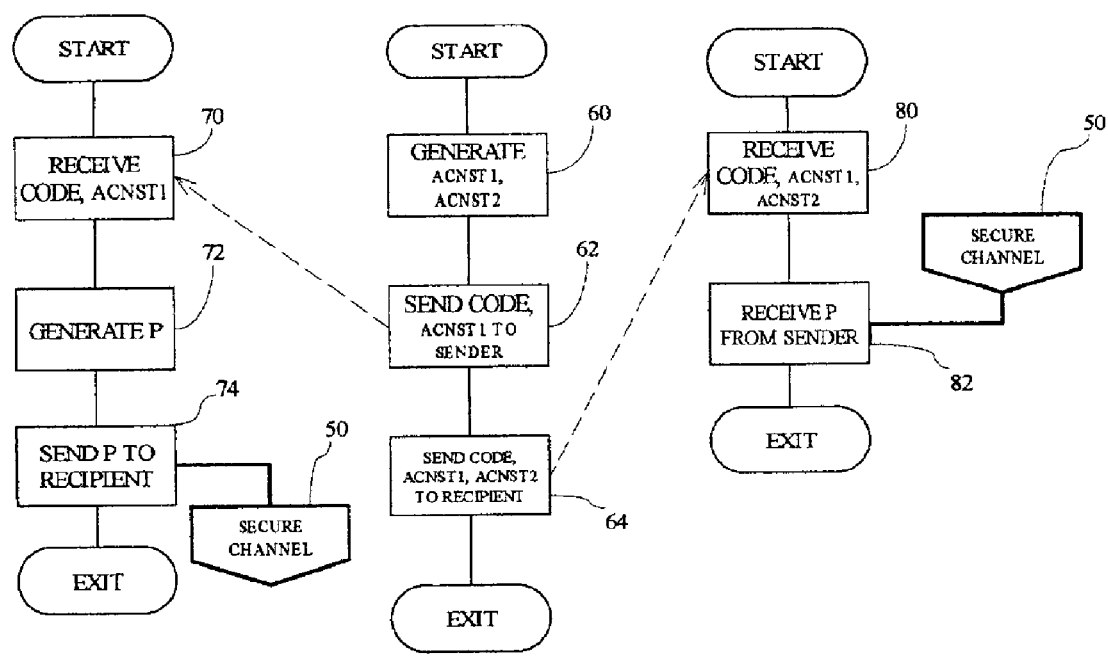
FIG. 2 shows a flow diagram of the initial set up of systems of FIG. 1.

FIG. 2 shows a flow diagram of the initial set up of systems 10 and 20 by server 30. At 60 server 30 generates two constants ACNST1 and ACNST2. These constants need not be kept secret and can be published for general use.

At 62 server 30 sends code for authentication of recipients and encryption of messages to sender system 10, as will be described further below. At this point, if the constant has not been made otherwise available, server 30 also sends ACNST1 to sender system 10.

At 64 server 30 sends code for the decryption of messages and response to authentication request to recipient system 20, and, if not otherwise available, sends ACNST1 and ACNST2 to recipient system 20 and then exits.

At 70 sender system 10 receives the code and the constant ACNST1. At 72 server system 10 generates a secret password P. At 74 sender system 10 sends password P to recipient system 20 over secure channel 50, and then exits.

At 80 recipient system 20 receives code for decryption of messages and response to authentication requests and constants ACNST1 and ACNST2, if not otherwise available. At 82 recipient system 20 receives password P from sender system 10 over secure channel 50, and exits.

It should be noted that code in accordance with the present invention is based upon a symmetric key algorithm, resulting in a short compact code which can be rapidly downloaded to sender system 10 and recipient system 20; an advantage not believed to be found in other systems for providing end-to-security for message transmission over a network such as the Internet.

By "downloading" herein is meant providing signals representative of code in accordance with the present invention to sender system 10 and recipient system 20 through any suitable form of computer-readable-medium. Preferably the computer-readable-medium is a sequence of digital signals communicated over Internet 40, as shown in FIG. 1, but includes, but is not limited to, other media such as floppy discs, CD's, memory chips or any other convenient form for transmitting signals representative of the code.

Figure 3:
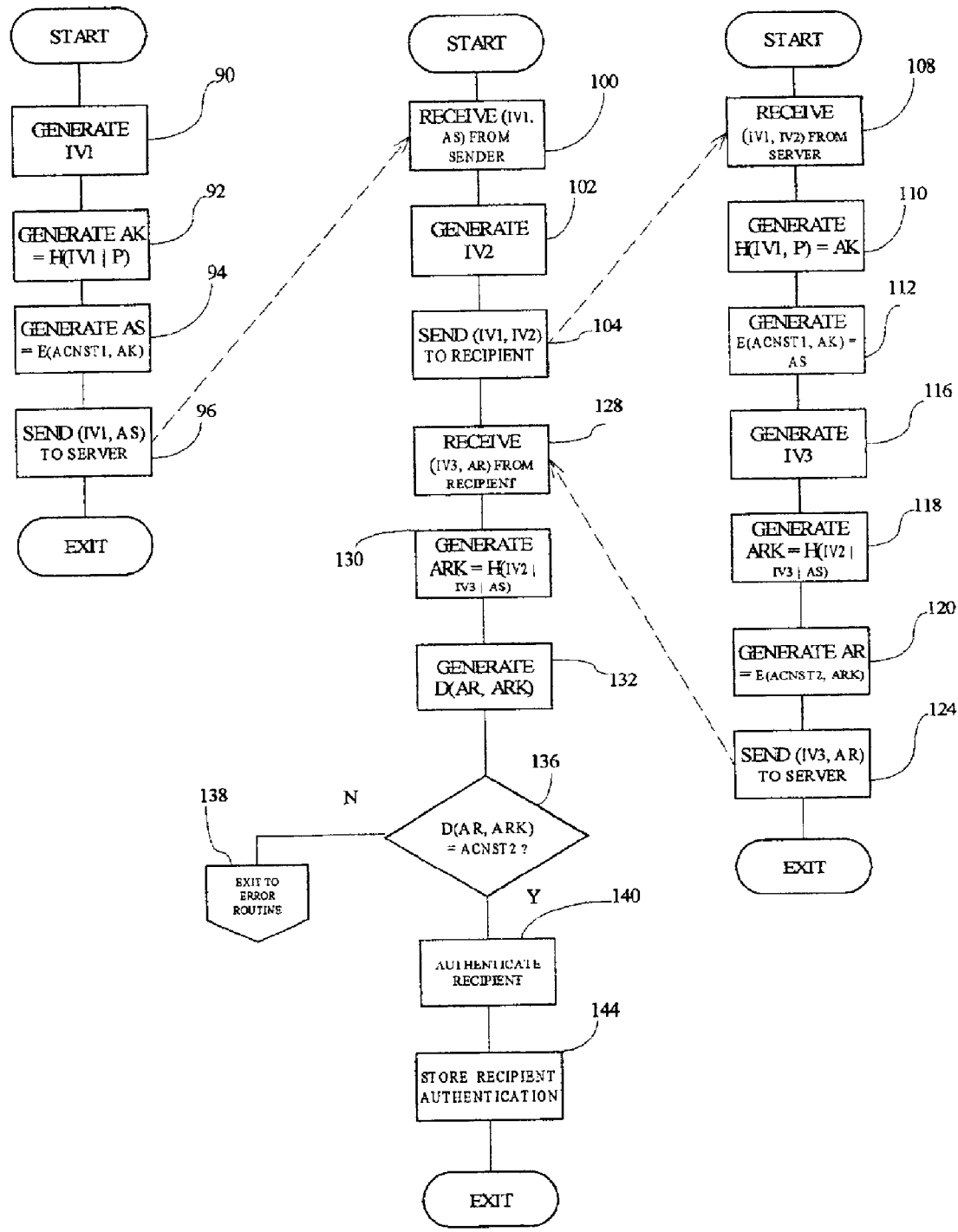
FIG. 3 shows a flow diagram of the authentication of a message recipient in accordance with the present invention.

FIG. 3 shows a flow diagram of the operation of the sender system 10, recipient system 20 and server 30 in authenticating recipient system 20. By "authenticating system 20" herein is meant providing server 30 with sufficient information to provide a satisfactory degree of assurance that system 10 is in fact communicating with system 20.

At 90 system 10 generates a random number as a first initialization vector IV1. At 92 sender system 10 generates an authentication key AK as H(IV 1|P). Then at 94 sender system 10 generates an authentication string AS as E(ACNST1, AK). At 96 sender system 10 sends (IV1, AS) to server 30, and exits.

At 100 server 30 receives (IV1, AS) from sender system 10. At 102 server 30 generates a second random number as a second initialization vector IV2. At 104 server 30 sends (IV 1, IV 2) to recipient system 20.

At 108 recipient system 20 receives (IV 1, IV 2) from server 30. At 110 recipient system 20 generates H(IV 1|P)=AK. At 112 recipient system 20 generates E(ACNST1, AK)=AS. At 116 recipient system 20 generates a third random number as third initialization vector IV 3. At 118 system 20 generates authentication response key ARK=H(IV 2|IV 3|AS). At 120 the system generates authentication response AR=E(ACNST2, ARK). At 124 recipient system 20 sends (IV 3, AR) to server 30 and exits.

At 128 server 30 receives (IV 3, AR) from recipient system 20. At 130 server 30 generates ARK=H(IV 2|IV 3|AS), and at 132 generates D(AR, ARK). Then at 136 server 30 determines if D(AR, ARK)=ACNST2?. If the answer at 136 is no, recipient system 20 is not authenticated and server 30 exits to an error routine at 138. Details of such error routine form no part of the present invention and will not be discussed further here. If the answer at 136 is yes, then at 140 server 30 authenticates recipient system 20 and at 144 stores the recipient authentication, and exits.

Figure 4:
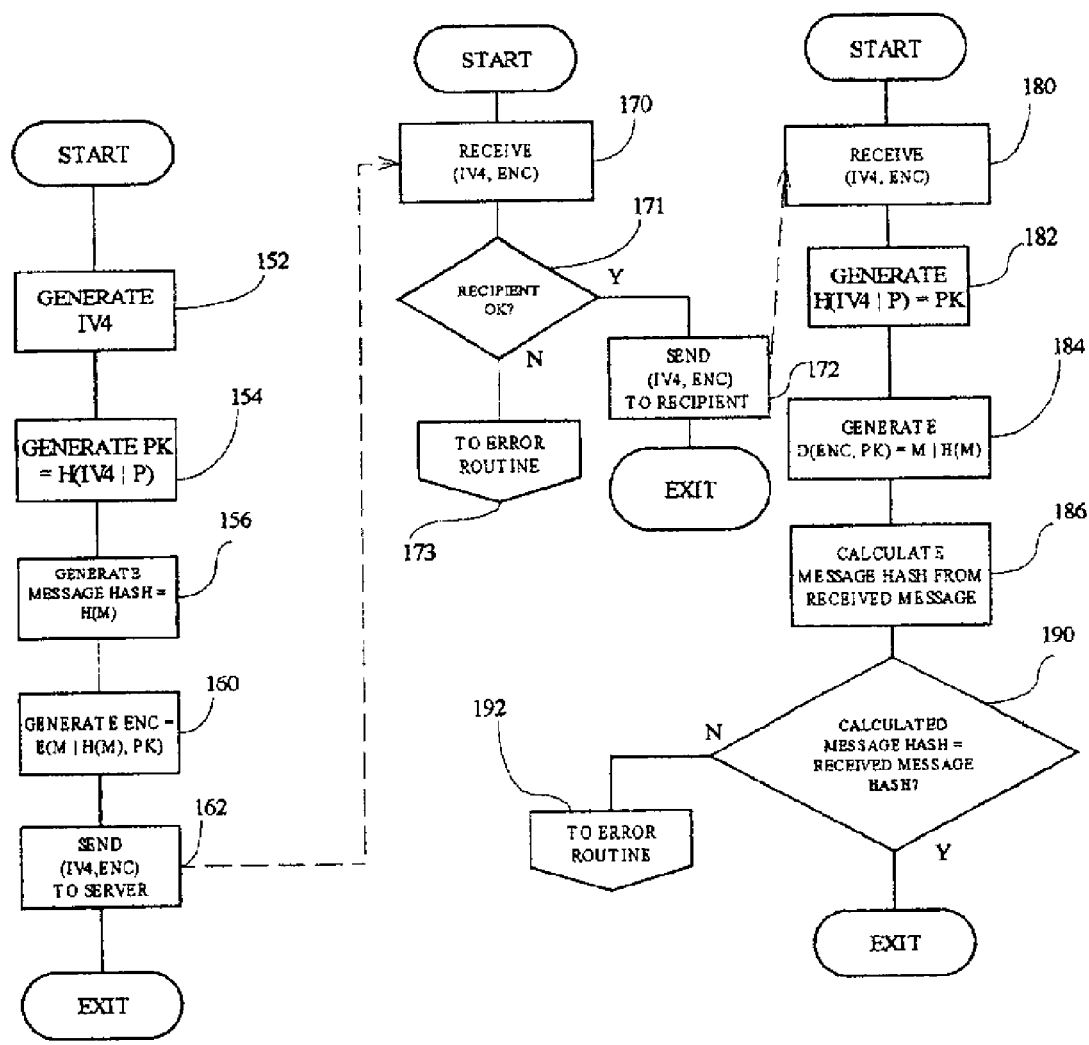
FIG. 4 shows a flow diagram of the transmission and receipt of a message in accordance with the present invention.

FIG. 4 shows a flow diagram of the operation of sender system 10, recipient system 20, and server 30 in the encryption, transmission and decryption of message M.

At 152 system 10 generates a 4th random number as a 4th initialization vector IV 4. At 154 system 10 generates private key PK=H(IV 4|P). At 156 system 10 generates a hash of message M=H(M). At 160 sender system 10 generates encryption ENC=E(M|H(M), PK). At 162 system 10 sends (IV 4, ENC) to server 30, and exits.

At 170 server 30 receives (IV 4, ENC) and, at 171, determines if the message recipient has been authenticated. If so, at 172, server 30 sends (IV 4, ENC) to recipient system 20, and exits. Otherwise, at 173 server 30 goes to an error routine whose details form no part of the present invention.

At 180 recipient system 20 receives (IV 4, ENC). At 182 system 20 generates H(IV 4|P)=PK. At 184 system 20 generates D(ENC, PK)=(M|H(M)).

At 186 System 20 calculates a value for a message hash from the value of message M received at 184, and at 190 determines if the calculated message hash equals the value received at 184. If the answer at 190 is no, system 20 exits to an error routine at 192. Details of the error routine at 192 form no part of the present invention and will not be discussed further here. If the answer at 190 is yes, the message is considered to be authentic and system 20 exits.

It should be noted that server 30 is never in possession of password P and so cannot access message M, create a false message M, or generate a false authentication for recipient system 20.

It should also be noted that since ACNST1 and ACNST2 are not secret, the functions of server 30 could be carried out by sender system 10. The embodiment described above is, however, preferred since, in general, communication through a trusted server is preferred in order to avoid the need to disclose an Internet address or the like to a recipient.

Figure 5:
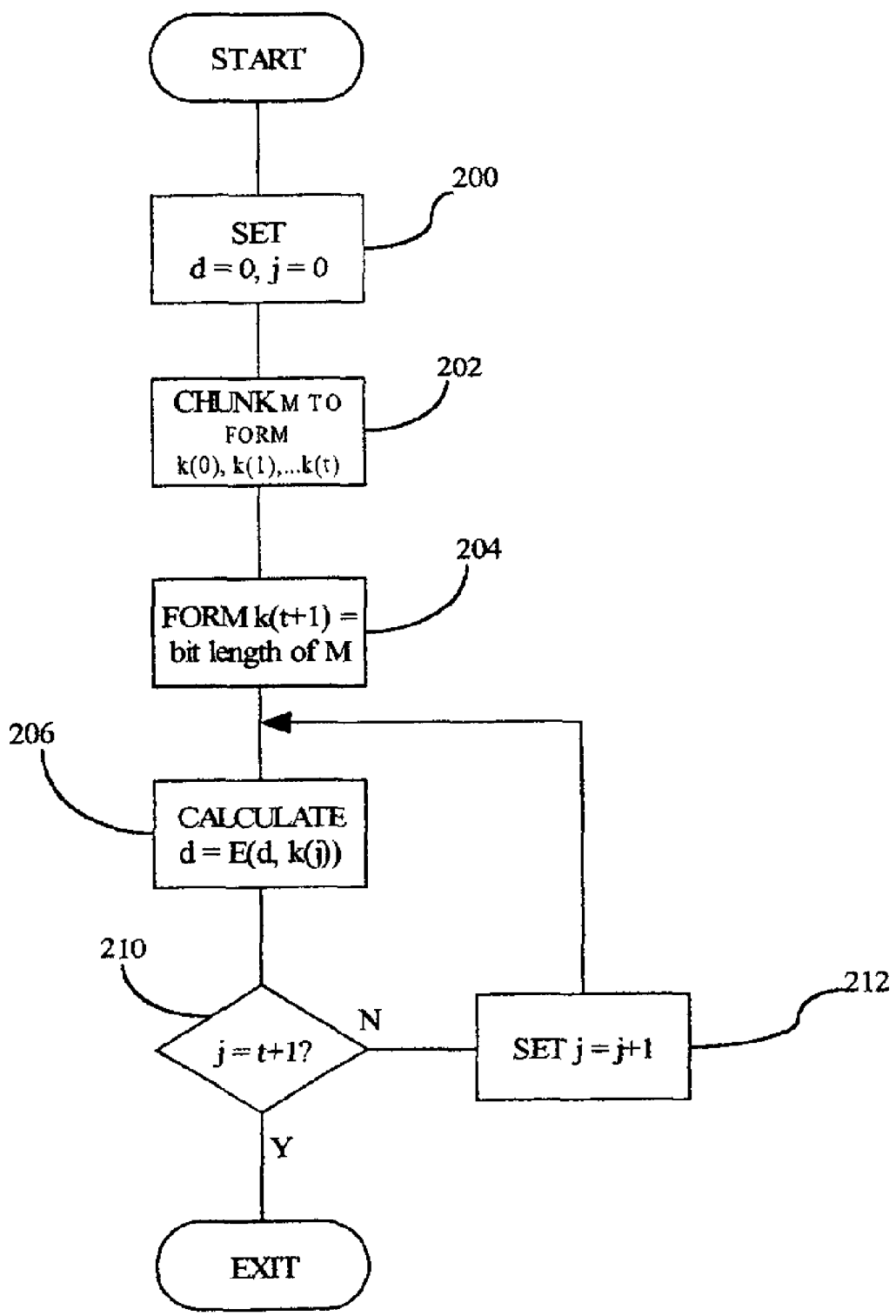
FIG. 5 shows a flow diagram of a hashing algorithm used in the present invention.

FIG. 5 shows a flow diagram of encryption algorithm H used above.

At 200 registers d and j are set equal to zero.

AT 202 message M is "chunked" to form a sequence of keys: k(o), k(1) . . . k(t). Message M is padded to the nearest integral value of n, where n is the length of the keys. (By "chunked" herein is meant dividing message M, padded as necessary, into t successive n bit segments.) Then at 204 key k(t+1)=the bit length of M, padded as necessary, is formed.

Then at 206 d is set equal to E(d, k)j)). At 210 the determination is made if j is equal to t+1. If not then at 212 j is set equal to j+1 and the algorithm returns to 206. If, at 210 j is equal to t+1 then the algorithm is complete.

Those skilled in the art will recognize that the algorithm described in FIG. 5 is defined in terms of a generic encryption algorithm using Merkle's meta-method for hashing. The algorithm of FIG. 5 will sometimes hereinafter be referred to as an "encryption algorithm defined hash". In accordance with an embodiment of the present invention, the encryption algorithm used is the same algorithm used for authentication and encryption of message M, as described above. This novel use of a single, symmetric key algorithm in a cipher suite is advantageous in providing the simplicity and small size which are objects of the present invention.

Preferably encryption algorithm E is the commercially available RC4 algorithm, which is advantageous in that it is of only a few hundred bytes in size. It is believed that the RC4 algorithm will provide adequate security in the present invention for communications of moderate value, though other algorithms may be necessary for communications of higher value.

Those skilled in the art will also recognize that the functions of sender system 10 and recipient system 20 may be interchanged in order to provide for bi-directional communications. However, description of the present invention, as set forth above, is presented in terms of uni-directional communications for reasons of simplicity, and is sufficient for those skilled in the art to fully understand the present invention.

The embodiments described above and illustrated in the attached drawings have been given by way of example and illustration only. From the teaching of the present application those skilled in the art will readily recognize other numerous embodiments in accordance with the subject invention. Accordingly, limitations on the present invention are to be found only in the claims set forth below.

What is claimed is:

1. A method for sending a message, said method comprising the steps of:

a) generating by a sender a password P;

b) sending the password P to a message recipient over a first channel;

c) generating authentication information by the sender for server authentication of the message recipient, wherein the authentication information is dependent on knowing the password P;

d) generating by the sender a random number as an initialization vector IV4;

e) generating by the sender a private key PK as H(IV4|P), where P is a password known to a message recipient, H( ) is an agreed upon hashing algorithm and (|) is a message concatenation;

f) generating by the sender an encryption ENC=E(M|H(M), PK), where E is a predetermined symmetric key encryption algorithm, M is the message;

g) sending the authentication information and (IV4, ENC) from the sender to the server over a second channel;

h) authenticating the message recipient over a third channel using the authentication information to verify that the message recipient knows the password P; wherein the authentication information comprises:

h-1) the authentication response AR as E(ACNST2, ARK) generated by the message recipient, where ACNST2 is a predetermined constant;

h-2) the authentication response key ARK as H(IV2|IV3|AS), where IV2 is a second random number (as a second initialization vector) generated by the server and IV3 is a third random number (as a third initialization vector) generated by the message recipient;

h-3) the authentication string AS is as E(ACNST1, PK), where ACNST1 is a predetermined constant and E is a predetermined symmetric key encryption algorithm and AK is an authentication key derived from the password P.

i) sending ENC from the server to the message recipient over the third channel only when the message recipient has been authenticated by the server.

2. A method as described in claim 1 comprising the further step of receiving authentication of said message recipient prior to sending (IV4, ENC).

3. A method as described in claim 1 wherein step c) further comprises the steps of:

i) generating by the sender a first random number as a first initialization vector IV1;

ii) generating by the sender H(IV1|P) as an authentication key AK;

iii) generating by the sender an authentication string AS as E(ACNST1, AK), where ACNST1 is a predetermined constant and E is a predetermined symmetric key encryption algorithm;

and wherein step g) further comprises the steps of sending IV1 and AS to the server over the second channel:

and wherein step h) further comprises the steps of:

iv) sending from the server said vectors IV1 and IV2 to said message recipient over the third channel;

v) regenerating by said message recipient the authentication key AK;

vi) regenerating by said message recipient the authentication string AS;

vii) sending from said message recipient to the server IV3 and AR;

viii) regenerating by the server the authentication response key ARK as H(IV2|IV3|AS);

ix) computing by the server a decryption D(AR, ARK), where D is a symmetric decryption algorithm corresponding to E; and x) authenticating said message recipient only if D(AR, ARK)=ACNST2, where ACNST2 is a second predetermined constant;

and wherein step i) comprises the steps of:

xi) generating D(ENC, PK)=(M|H(M)), where D is a symmetric key decryption algorithm corresponding to E;

xii) calculating H(M) from said value of M generated in step c; and xiii) accepting said generated value of M only if said calculated value of H(M) equals said value of H(M) generated in step c).

4. A method as described in claim 1 where H is an encryption algorithm defined hash algorithm using said encryption algorithm E.

5. A method as described in claim 4 where said encryption algorithm is expressed in less than 1000 bytes of code; whereby software comprising said algorithm can be quickly downloaded to a user's system.

6. A method as described in claim 5 where said encryption algorithm is an RC4 algorithm.

7. A system for sending a message, said system comprising:

a) means for generating by a sender a password P;

b) means for sending the password P to a message recipient over a first channel;

c) means for generating authentication information by the sender for server authentication of the message recipient, wherein the authentication information is dependent on knowing the password P;

d) means for generating by the sender a random number as an initialization vector IV4;

e) means for generating by the sender a private key PK as H(IV4|P), where P is a password known to a message recipient, H( ) is an agreed upon hashing algorithm and (A|B) is a message concatenation;

f) means for generating by the sender an encryption ENC= E(M|H(M), PK), where E is a predetermined symmetric key encryption algorithm, M is the message;

g) means for sending the authentication information and (IV4, ENC) from the sender to the server over a second channel;

h) means for authenticating the message recipient over a third channel using the authentication information to verify that the message recipient knows the password P; wherein the authentication information comprises:

h-1) the authentication response AR as E(ACNST2, ARK) generated by the message recipient, where ACNST2 is a predetermined constant;

h-2) the authentication response key ARK as H(IV2|IV3|AS), where IV2 is a second random number (as a second initialization vector) generated by the server and IV3 is a third random number (as a third initialization vector) generated by the message recipient;

h-3) the authentication string AS is E(ACNST1, PK), where ACNST1 is a predetermined constant and E is a predetermined symmetric key encryption algorithm, i) means for sending ENC from the server to message recipient over the third channel only when the message recipient has been authenticated by the server.

* * * * *